(12) United States Patent
Broecker et al.

(10) Patent No.: US 7,086,116 B2
(45) Date of Patent: Aug. 8, 2006

(54) TOOTHBRUSH

(75) Inventors: Gerd Broecker, Neustadt (DE);
Matthias Georgi, Buehl (DE);
Berthold Meyer, Neustadt (DE);
Wolf-Dieter Müller, Buehl (DE)

(73) Assignee: GlaxoSmithKline Consumer Healthcare GmbH & Co. KG, Buehl (DE)

( * ) Notice: Subject to any disclaimer, the term of this patent is extended or adjusted under 35 U.S.C. 154(b) by 298 days.

(21) Appl. No.: 10/149,803

(22) PCT Filed: Nov. 30, 2000

(86) PCT No.: PCT/EP00/12081

§ 371 (c)(1),
(2), (4) Date: Nov. 13, 2002

(87) PCT Pub. No.: WO01/43581

PCT Pub. Date: Jun. 21, 2001

(65) Prior Publication Data

US 2003/0163883 A1    Sep. 4, 2003

(30) Foreign Application Priority Data

Dec. 14, 1999    (GB) ................................. 9929400.1

(51) Int. Cl.
*A46B 9/04*    (2006.01)
(52) U.S. Cl. ..................... 15/167.1; 15/144.1; 15/172
(58) Field of Classification Search ............. 15/167.1, 15/144.1, 172, 143.1, 201, 167.2
See application file for complete search history.

(56) References Cited

U.S. PATENT DOCUMENTS

| | | | | |
|---|---|---|---|---|
| 1,694,636 A | * | 12/1928 | Barker ...................... | 15/110 |
| 5,054,154 A | * | 10/1991 | Schiffer et al. ............ | 15/167.1 |
| 5,315,732 A | * | 5/1994 | Huefner et al. ............ | 15/167.1 |
| 5,323,504 A | * | 6/1994 | McCusker ................. | 15/167.1 |
| 5,630,244 A | * | 5/1997 | Chang ....................... | 15/167.1 |
| 5,673,452 A | * | 10/1997 | Chang et al. .............. | 15/167.1 |
| 6,003,189 A | * | 12/1999 | Falleiros .................... | 15/167.1 |

FOREIGN PATENT DOCUMENTS

| | | | | |
|---|---|---|---|---|
| DE | 3923495 C | * | 1/1991 | |
| GB | 2282959 A | * | 4/1995 | |
| WO | WO0030493 A | * | 6/2000 | |

* cited by examiner

*Primary Examiner*—Gladys J. P. Corcoran
*Assistant Examiner*—Shay Balsis
(74) *Attorney, Agent, or Firm*—Nora Stein-Fernandez; Theodore R. Furman; Charles M. Kinzig

(57) ABSTRACT

A dental cleaning implement such as a toothbrush, having longitudinally disposed first and second parts flexibly joined together. Between the first and second parts is a rotatable member such that when the implement bends the first parts adjacent to the member bear upon the member. The rotatable member has circumferentially disposed relatively softer and harder regions, so that as the member is rotated the parts can be caused to bear compressibly upon selected softer or harder regions.

12 Claims, 3 Drawing Sheets

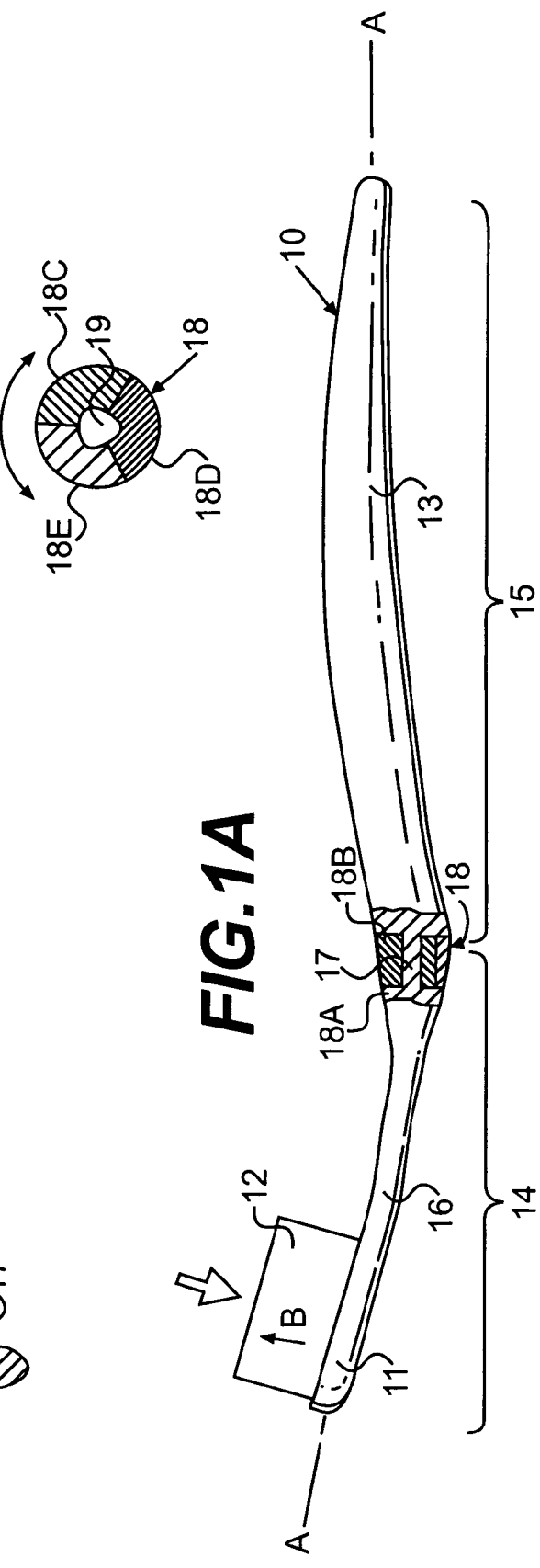
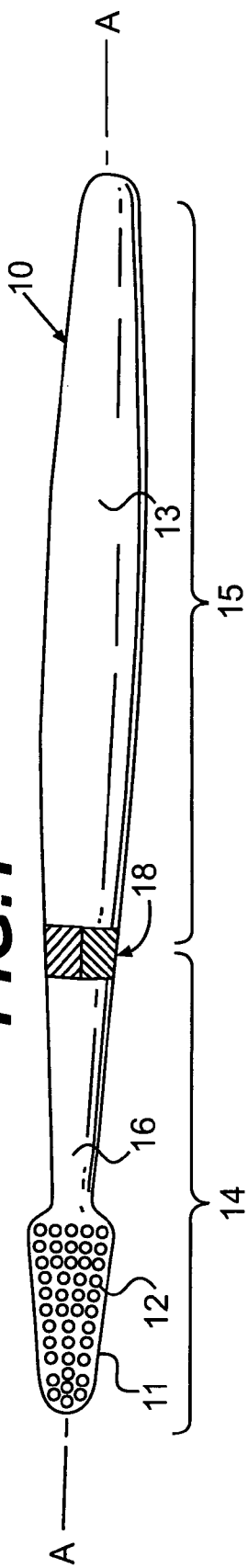
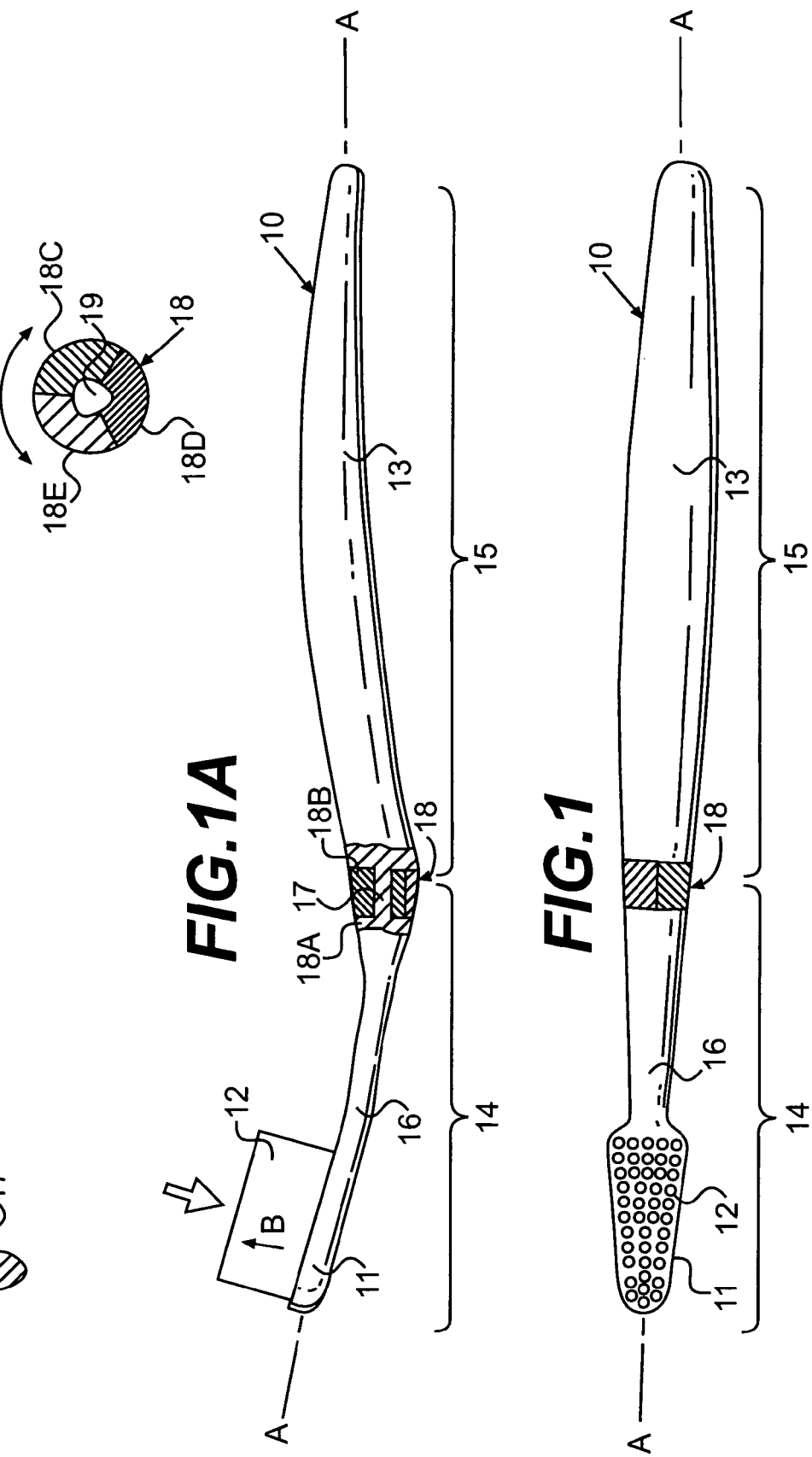

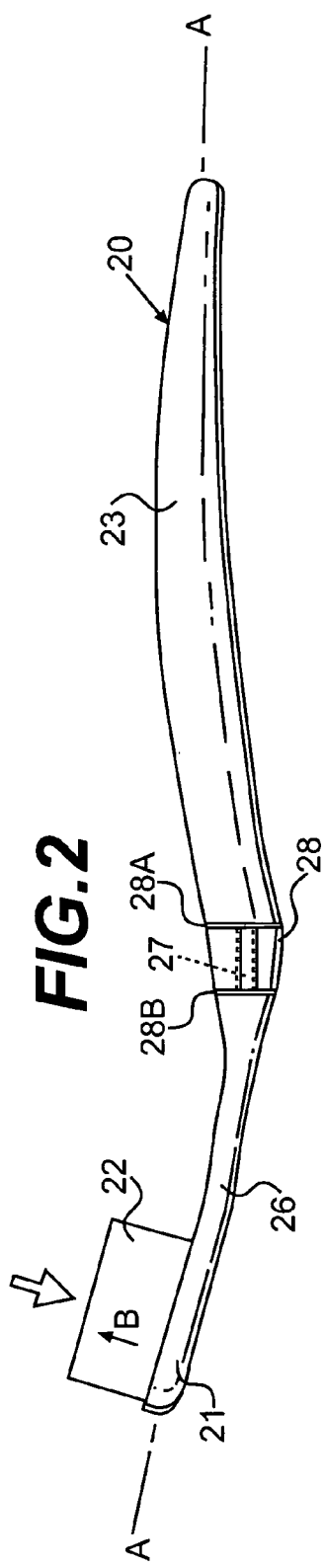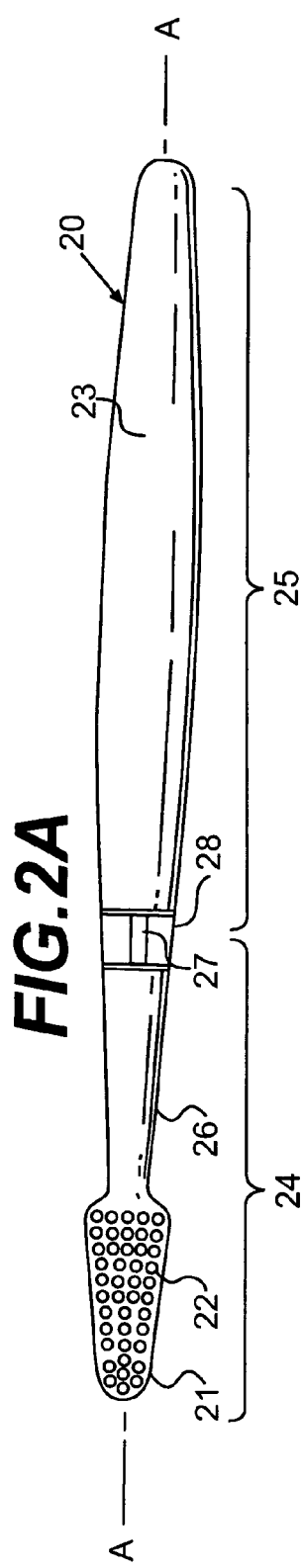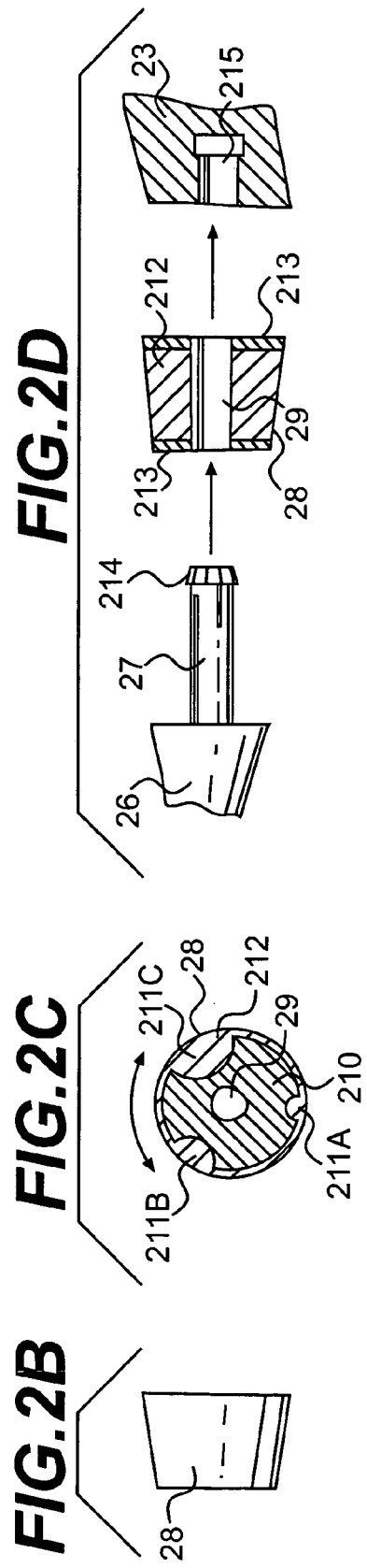

TOOTHBRUSH

FIELD OF INVENTION

This invention relates to dental cleaning implements, especially to toothbrushes having a resiliently flexible region in their structure, particularly having such a structure situated in their handle or between their head and their handle.

BACKGROUND OF THE INVENTION

Toothbrushes generally comprise a head carrying a dental cleaning tool, normally a cluster of bristles in a toothbrush, and a grip handle, arranged along a longitudinal head-handle direction. Often there is a thinned neck region between the head and the part of the handle which is gripped by the user during use. It is known to incorporate a resiliently flexible region in the handle or between the head and the handle to help to relieve excessive pressure from being applied to the teeth or other mouth tissues of the user during implementing. Examples of such resiliently flexible regions in toothbrushes are disclosed in EP 0 0336 641A (Lingner+Fischer GmbH) and DE 39 234 95 (M+C Schiffer GmbH).

Different users of toothbrushes may prefer or need toothbrushes having different degrees of resilient flexibility of such a region. At present the user has no option except to purchase a complete different implement having a selected degree of flexibility of such a region.

It is an object of this invention to provide a dental cleaning implement particularly a toothbrush having a resiliently flexible region in its structure wherein the resilience and/or flexibility of the region may be altered by the user.

According to this invention a dental cleaning implement is provided having a head which carries a dental cleaning tool, and a grip handle, the head and handle being disposed along a longitudinal head-handle direction, the implement comprising longitudinally disposed first and second parts which are joined together by means of a flexible link which allows the implement to bend about the link under the action of pressure applied in a direction sideways of the longitudinal direction, situated longitudinally between the first and second parts there is a member which is rotatable about the longitudinal direction of the implement, and such that when the implement bends about the flexible link the first and/or second parts adjacent to the member bear compressibly upon the member, the member comprising circumferentially disposed relatively less and more resiliently hard regions, so that as the member is rotated the first and second parts can be caused to bear compressibly upon selected less or more hard regions.

DETAILED DESCRIPTION OF THE INVENTION

By "resiliently hard" herein is meant primarily that under the action of applied pressure, i.e. compression the region deforms, and upon release of the pressure the region returns to the position it had before the pressure was applied. By "relatively less resiliently hard" herein is meant primarily that for a unit of pressure the structure displaces more than a "relatively more resiliently hard" region, or that less pressure is required to cause a unit of displacement than is required for a "relatively more resiliently hard" region.

The dental cleaning implement may preferably be a toothbrush having a dental cleaning tool which comprises a cluster of bristles projecting from the head in the manner of a conventional toothbrush or may comprise a dental flossing tool.

The flexible link may for example be located in the handle of the implement, for example between the grip handle and the neck of the implement. Alternatively and preferably the flexible link may be located between the part of the grip handle which is held by the user and the neck.

A preferred form of link is a thin longitudinally extending spine of the construction material of the implement, e.g. a plastics material, and this may be made integrally with the first and/or second parts. Suitably this link may provide an axle about which the member can rotate. Such a spine may be of any suitable cross section and dimensions to provide flexibility.

The member may for example be of a wheel or cylinder shape which is mounted rotatably on such a link, and between the first and second parts. If the spine is of non-circular cross section, and the member has an axial channel through it of corresponding section through which the spine is threaded as an axle, then this construction can enable the member to seat itself in a selected rotational position on the axle with a selected region of the member adjacent to selected part of the first and second parts. For example such a member may snap into a selected rotational position on the axle.

The circumferentially disposed less and more resiliently hard regions of the member may be provided by various means. For example the member may be made of a plurality of circumferentially disposed regions of relatively less and more resiliently hard material, for example an elastomer material. The relatively less and more resiliently hardness of such a material as an elastomer may be provided by for example different materials, different grades (e.g. foamed and non-foamed), or different thicknesses of a resilient material such as a polymer above a hard substrate such as a hard plastics material.

For example the regions may be disposed circumferentially in the manner of "pie" segments divided by radii of a constructed circle, so that as the member is rotated the first and second parts can be caused to bear compressibly upon selected less or more hard segments.

For example alternatively the member may be of a generally cylinder shape mounted rotably on the link, and has a hard substrate one end surface of which is generally perpendicular to the longitudinal direction, but the other end surface is at a non perpendicular angle to the direction. A part of the member adjacent to the non-perpendicular end is made of a softer material above the underlying hard substrate, so that the depth of the softer material in the longitudinal direction above the end surface varies around the circumference of the member, so that as the member is rotated the first and second parts can be caused to bear compressibly upon more or less deep regions of the softer material.

The implement e.g. a toothbrush, of the present invention may be made of plastics and elastomer materials conventional in the art of toothbrush manufacture, as may other parts of the implement such as the head, grip handle and the dental cleansing tool such as a cluster of nylon bristles.

The implement of the present invention may be made of such materials by an injection moulding process, therefore in a further aspect the present invention provides an injection moulding process wherein a implement as described above is made, and furthermore the present invention provides one or more injection moulds suitable for use in such an injection moulding process.

BRIEF DESCRIPTION OF THE DRAWINGS

The invention will now be described by way of example with references to the figures as follows.

FIG. 1 is a top view of an embodiment of a toothbrush of the invention;

FIG. 1A is a side view of the toothbrush of FIG. 1;

FIG. 1B is an enlarged view of region 18 of a toothbrush of the invention;

FIG. 1C is an enlarged cross-sectional view of region 17 of a toothbrush of the invention;

FIG. 2 is a side view of an embodiment of a toothbrush of the invention;

FIG. 2A is a top view of the toothbrush of FIG. 2;

FIG. 2B is an enlarged view of member 28 of a toothbrush of the invention;

FIG. 2C is a detailed and enlarged cross-sectional view of member 28 of a toothbrush of the invention;

FIG. 2D is a cross-sectional view of region 27 of a toothbrush of the invention.

Referring to FIG. 1, a toothbrush is shown overall 10, having a head 11 which carries a cluster of bristles 12 extending in a bristle direction B. The toothbrush 10 has a grip handle 13, the head 11 and handle 13 being disposed along a longitudinal head-handle direction A—A. The toothbrush is in the form of two longitudinally disposed first 14 and second 15 parts, part 14 comprising the head 11 and a neck region 16 and is integrally formed with the head 11. Part 15 comprises the handle 13. Parts 14 and 15 are joined together by means of a flexible link 17 seen in cross-section in FIG. 1C. which is a thin flexible longitudinally extending spine extending between parts 14 and 15. The toothbrush 10 bends about the link 17 under the action of pressure applied to the head 11 during toothbrushing, in the direction of the arrow shown.

Figure 3:
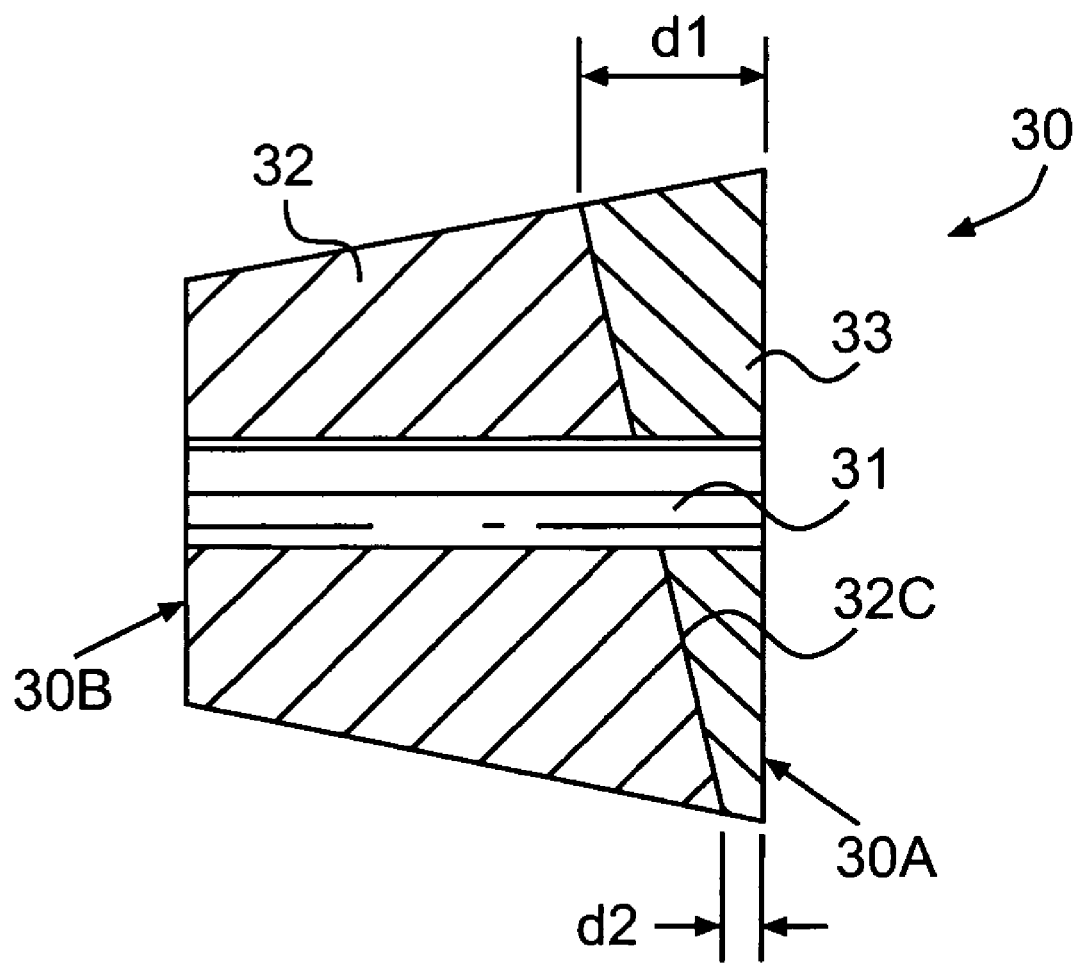
FIG. 3 is an alternative construction of member 28.

Longitudinally between the first and second parts 14, 15 there is a member 18 which is rotatable about the longitudinal direction of the toothbrush 10. The member 18 is of a generally cylinder shape tapering conically from a wider end facing the handle 13 toward a narrower end facing the head 11, and is mounted rotatably on the link 17. The spine 17 is of non-circular, i.e. trefoil, cross section as shown in FIG. 1A. The member 18 has an axial channel 19 longitudinally through it of corresponding section through which the spine 17 is threaded as an axle. This construction enables the member 18 to seat as shown in FIG. 1B in a selected rotational position on the axle 17. Rotation of the member 18 on the non-circular section axle 17 can allow the member 18 to snap into and be retained in a selected rotational position on the axle 17.

When the toothbrush 10 bends about the flexible link 17 the first 14 and/or second 15 parts adjacent to the member 18 bear compressibly upon the member at points 18A and 18B.

As shown in FIG. 1B the member 18 comprises three circumferentially disposed relatively less and more resiliently hard regions 18C, 18D, 18E. These regions 18C, 18D, 18E are disposed circumferentially in the manner of segments divided by radii of a constructed circle. Region 18C is a relatively less compressibly resiliently hard region, region 18E is a relatively less compressibly resiliently hard region, and region 18D is of intermediate compressibly resilient hardness. This is achieved by the regions 18C, 18D, 18E being made of relatively less, more and intermediate resiliently hard elastomer material. As the member 18 is rotated the first 14 and second 15 parts can be caused to bear compressibly at 18A and 18B upon selected less or more hard regions 18C, 18D, 18E.

This enables the flexibility of the toothbrush 20 as experienced by the user to be varied by the user by rotation of the member 18.

Referring to FIG. 2, and FIG. 2A a toothbrush is shown overall 20, having a head 21 which carries a cluster of bristles 22 extending in a bristle direction B. The toothbrush 20 has a grip handle 23, the head 21 and handle 23 being disposed along a longitudinal head-handle direction A—A. The toothbrush is in the form of two longitudinally disposed first 24 and second 25 parts, part 24 comprising the head 21 and a neck region 26 and is integrally formed with the head 21. Part 25 comprises the handle 23. Parts 24 and 25 are joined together by means of a flexible link 27 which is a thin flexible longitudinally extending spine extending between parts 24 and 25. The toothbrush 20 bends about the link 27 under the action of pressure applied to the head 21 during toothbrushing in the direction of the arrow shown.

Longitudinally between the first and second parts 24, 25 there is a member 28 which is rotatable about the longitudinal direction A—A of the toothbrush 20. The member 28 shown in FIG. 2B is of a generally cylinder shape tapering conically from a wider end facing the handle 23 toward a narrower end facing the head 21 and is mounted rotatably on the link 27. The spine 27 is of non-circular, i.e. trefoil, cross section as shown in FIG. 2B. The member 28 has an axial channel 29 longitudinally through it of corresponding section through which the spine 27 is threaded as an axle. This construction enables the member 28 to seat in a selected rotational position on the axle 27 in a manner analogous to FIG. 1.

When the toothbrush 20 bends about the flexible link 27 the first 24 and/or second 25 parts adjacent to the member 28 bear compressibly upon the member at points 28A and 28B (see FIG. 2D).

As shown in FIG. 2C the member 28 comprises a hard plastic substrate 210 which has three circumferentially disposed cavities 211A, 211B, 211C extending inwardly from the circumference of the substrate 29. Cavity 211A is a relatively shallow cavity, cavity 211C is a relatively deep cavity, and cavity 211B is of intermediate depth. These cavities 211A, 211B and 211C are filled with a compressible resilient elastomer material 212 which completely envelopes the circumference of the substrate 29. The regions of the elastomer 212 respectively in the cavities 211A, 211B and 211C consequently are respectively relatively less, more and intermediate resiliently hard. As the member 28 is rotated the first 24 and second 25 parts can be caused to bear compressibly at 28A and 28B upon selected less or more hard regions 211A, 211B and 211C. The member 28 may be provided at its longitudinal ends with bearing surfaces 213, e.g. of a smooth plastic material to facilitate rotation.

Referring to FIG. 3 an alternative construction 30 of the member 28 of FIG. 2B is shown. The member 30 is of a generally cylinder shape tapering conically from a wider end 30A facing the handle 23 toward a narrower end 30B facing the head 21 and is mountable rotatably on the link 27. The member 30 has an axial channel 31 longitudinally through it of corresponding section through which the spine 27 is threaded as an axle. In the construction shown in FIG. 3 the member 30 comprises a hard plastic substrate 32, the narrower end surface of which 30B is perpendicular to the longitudinal direction A—A, but the wider end surface 32C is at a non perpendicular angle to the direction A—A. The part 33 of the member 30 adjacent to the end 30A is made of a soft compressibly resilient elastomer material, the end surface 30A of which is perpendicular to the direction A—A. This means that the depth of the elastomer material in the longitudinal direction above the end surface 30A and consequently the compressibility of the elastomer varies around the circumference of the member 30, between the two extremes d1 and d2. At the depth d1 the elastomer material has a greater resilient hardness than at the depth d2, and therefore by rotation of the member 30 in a manner analogous to that of member 28 the parts 24, 25 can be brought to bear on less and more resiliently hard regions.

This enables the flexibility of the toothbrush 20 as experienced by the user to be varied by the user by rotation of the member 28 or 30.

The toothbrushes 10 and 20 of FIGS. 1 and 2 may be made by techniques which will be apparent to those skilled in the art. For example part 14 may be made first, with the spine 17 made integrally with it. The member 18 may be separately made and threaded on the spine 17. Then link 17 may be enclosed in an injection mould (not shown) and part 15 may be separately injection moulded in this mould so that it fuses with link 17 at its end closest to the handle and is thereby integrally connected to part 14. As shown in FIG. 2A, part 24 may be made first, with the link 27 formed integrally with it and having a snap fit connection 214 (see FIG. 2D) at its end distal from the head 21. The member 28 or 30 may be made separately and then threaded onto the link 27. The part 25 may be made separately having a socket 215 (see FIG. 2D) at its end closest to the head 21, into which the connection 214 can snap fit as shown to connect parts 24 and 25 together. To enable the member 18, 28, 30 to be mounted on the axle the member may for example be split longitudinally to enable the member to be snap-fitted onto the axle.

The members 18, 28, 30 may be made by known two-component injection moulding techniques.

The invention claimed is:

1. A dental cleaning implement having a head which carries a dental cleaning tool, and a grip handle, the head and handle being disposed along a longitudinal head-handle direction, the implement comprising longitudinally disposed first and second parts which are joined together by means of a flexible link which allows the implement to bend about the link under the action of pressure applied in a direction sideways of the longitudinal direction, wherein situated longitudinally between the first and second parts there is a member which is rotatable about the longitudinal direction of the implement, and such that when the implement bends about the flexible link the first and/or second parts adjacent to the member bear compressibly upon the member, the member comprising circumferentially disposed relatively less and more resiliently hard regions, so that as the member is rotated the first and second parts can be caused to bear compressibly upon selected less or more hard regions.

2. A dental cleaning implement according to claim 1 wherein a dental cleaning tool which comprises a cluster of bristles projecting from the head.

3. A dental cleaning implement according to claim 1 wherein the flexible link is located in the handle of the implement.

4. A dental cleaning implement according to claim 1 wherein the flexible link is located between the part of the grip handle which is held by the user and the neck.

5. A dental cleaning implement according to claim 1 wherein the link is a thin longitudinally extending spine of the construction material of the implement.

6. A dental cleaning implement according to claim 5 wherein the link provides an axle about which the member can rotate.

7. A dental cleaning implement according to claim 5 wherein the spine is of non-circular cross section, and the member has an axial channel through it of corresponding section through which the spine is threaded as an axle.

8. A dental cleaning implement according to claim 1 wherein the member is of a wheel or cylinder shape which is mounted rotatably on the link and between the first and second parts.

9. A dental cleaning implement according to claim 1 wherein the circumferentially disposed less and more resiliently hard regions of the member are provided by the member being made of a plurality of circumferentially disposed regions of relatively less and more resiliently hard material.

10. A dental cleaning implement according to claim 9 wherein the relatively less and more resiliently hardness of the material is provided by regions of different materials, different grades, or different thicknesses of a resilient material.

11. A dental cleaning implement according to claim 1 wherein the regions are disposed circumferentially in the manner of segments divided by radii of a constructed circle, so that as the member is rotated the first and second parts can be caused to bear compressibly upon selected less or more hard segments.

12. A dental cleaning implement according claim 1 wherein the member is of a generally cylinder shape and is mounted rotably on the link, and has a hard substrate one end surface of which is generally perpendicular to the longitudinal direction, but the other end surface is at a non perpendicular angle to the direction, a part of the member adjacent to the non-perpendicular end is made of a softer material above the underlying hard substrate, so that the depth of the softer material in the longitudinal direction above the end surface varies around the circumference of the member, and the first and second parts can be caused to bear compressibly upon more or less deep regions of the softer material.

* * * * *